(12) United States Patent  (10) Patent No.: US 6,616,045 B2
Komai                     (45) Date of Patent:    Sep. 9, 2003

(54) TRANSFER PROCESSING SYSTEM FOR BAR CODE DATA

(75) Inventor: Takuo Komai, Nagoya (JP)

(73) Assignee: Neorex Co., Ltd., Aichi-ken (JP)

( * ) Notice: Subject to any disclaimer, the term of this patent is extended or adjusted under 35 U.S.C. 154(b) by 0 days.

(21) Appl. No.: 09/855,372

(22) Filed: May 15, 2001

(65) Prior Publication Data

US 2001/0042790 A1 Nov. 22, 2001

(30) Foreign Application Priority Data

May 16, 2000 (JP) .................................. 2000-143073

(51) Int. Cl.[7] .............................................. G06F 17/00
(52) U.S. Cl. ........................... 235/462.15; 235/472.01; 348/7
(58) Field of Search ..................... 235/462.15, 472.01; 347/7

(56) References Cited

U.S. PATENT DOCUMENTS

| 5,640,193 | A | * | 6/1997 | Wellner | 705/26 |
| 5,933,829 | A | | 8/1999 | Durst et al. | 707/10 |
| 5,978,773 | A | | 11/1999 | Hudetz et al. | 705/23 |
| 6,098,106 | A | | 8/2000 | Philyaw et al. | 709/238 |
| 6,108,656 | A | | 8/2000 | Durst et al. | 707/10 |
| 6,164,541 | A | * | 12/2000 | Dougherty et al. | 235/375 |
| 6,386,453 | B1 | * | 5/2002 | Russell et al. | 235/375 |
| 6,412,699 | B1 | * | 7/2002 | Russell et al. | 235/375 |

FOREIGN PATENT DOCUMENTS

| JP | 07-073242 | 3/1995 |
| JP | 09-054801 | 2/1997 |
| JP | 10-015498 | 1/1998 |
| JP | 11-003392 | 1/1999 |
| JP | 11-272742 | 10/1999 |

* cited by examiner

Primary Examiner—Karl D. Frech
Assistant Examiner—Kim Nguyen
(74) Attorney, Agent, or Firm—Barnes & Thornburg

(57) ABSTRACT

A system classifies and transfers various bar code data read with a bar code reader to a specified destination in accordance with contents of bar code data without a user's consciousness. Bar code data, which is read with a bar code reader 10 connectable to the Internet N through an interface 20a, is received by a transfer processing apparatus DS. In the apparatus DS, a reference database, which previously defines a destination or the like where the received bar code data is to be delivered, the delivery destination corresponding to an attribute of the received bar code data, is stored in a memory 140. The apparatus DS extracts the attribute of the received bar code data, reads out the destination information defined so as to correspond to the attribute, and transmit the data to host computers 200A, 200B and 200C, specified with the destination information.

5 Claims, 3 Drawing Sheets

FIG. 2

| ALLOCATION RANGE (ATTRIBUTE) | DESTINATION INFORMATION | |
|---|---|---|
| | DESTINATION CODE | SPECIFIED PROCESS |
| 0000-0999 | AIC ("A INDUSTRY") | (1) RETURN ORDER CONFIRMATION MAIL TO TRANSMITTER (2) TRANSFER BAR CODE DATA TO DESTINATION |
| 1000-1999 | BCS ("B CARE SERVICE") | TOTALIZE WORKING CONTENTS AND WORKING TIME, GENERATE FILE IN SPECIFIED FORMAT AND TRANSFER BAR CODE DATA TO DESTINATION |
| 2000-2999 | CSD ("C SOFTWARE") | TRANSFER BAR CODE DATA WITHOUT SPECIFIC PROCESSING |
| ... | ... | ... |
| ... | ... | ... |
| ... | ... | ... |

TRANSFER PROCESSING SYSTEM FOR BAR CODE DATA

BACKGROUND OF THE INVENTION

1. Field of the Invention

The present invention relates to a system for classifying and transferring bar code data read with a bar code reader, more particularly to a system for classifying a bar code data under a specified processing in accordance with an attribute given to an individual bar code to perform transfer processing for the same.

2. Description of the Related Art

A bar code is now widely used as an identification code for an article of trade or the like which is distributed in the market. And such a bar code gives important data when sales information is collected and managed intensively for each article and for each sales point of time in a convenience store, a supermarket or the like. Moreover, such a bar code is also utilized as means for saving labors, instead of inputting data from a keyboard into a personal computer or the like through complicated operation steps. In this case, a specified operation step is previously allocated to a bar code, and the bar code is simply read and inputted with a bar code reader, thus executing an operation step allocated to the bar code. As a development example for saving labors of this type, there exists an invention described in Japanese Patent Laid-open Publication No. Hei 7-219876 filed by the present applicant.

In general, such a bar code variously applicable is preferably made as small as possible in size from viewpoints of minimizing its influence on an article appearance such as packaging and so on. In order to meet such a demand, the present applicant has developed a so-called "micro-bar code" having thinner bars, the thinnest one of which has an about 100 $\mu$m, and in which an area of the bar code can be limited to a range from about ¹⁄₂₀ to ¹⁄₃₀ in comparison with that of the conventional general bar code, and has also put a micro-bar code reader into practical use, which is capable of reading the micro-bar code with a higher accuracy (as disclosed in Japanese Paten Laid-open Publication No. Hei 5-182001 and so on). Through making the most of its miniature characteristic in comparison with the conventional bar code, the micro-bar code has been widely used as means for a simple display of article codes on catalogues and magazines. The micro-bar code reader itself is not limited to the use of being connected to a fixed terminal such as a shop register or a personal computer, but is planned to be connected to a portable terminal such as a portable telephone, thus enabling data inputting from anyplace and anytime.

As described above, the bar code, particularly the micro-bar code, is being expanded to various purposes of usage. However in this case, there exists a problem that a user must access sites different from each other in accordance with services the user uses, and must transmit the read data to the different sites. In other words, when using a service such as article sales, a user must telephone, or access the Internet to transmit the bar code data through a specified access point defined by each service provider. Although inputting of data has been simplified by bar-coding substantial information contents such as an order code or a service code, the user still has to select consciously a specified access point for each service provider to transmit the bar code data. Under such circumstances, the more variously the services are provided, the more complicated the user's handling becomes. This lessens the convenience obtained with an effort.

SUMMARY OF THE INVENTION

The present invention was made in order to solve the foregoing problems. The object of the present invention is to provide a transfer processing system for bar code data, which is capable of reducing labors of a user who transmits, in which read bar code data is passed to a specified provider of a service or the like through predetermined processing without the transmitter's consciousness.

In order to achieve the foregoing object, a transfer processing system for bar code data according to the present invention for executing delivering processing for the bar code data, comprises a delivering apparatus, wherein the bar code data is read with a bar code reader connectable to a communication network and is sent out thereto, and the delivering apparatus is connected to the communication network and receives the bar code data read with the bar code reader through the communication network;

previously defines and stores delivery destination information indicating delivery destination to which the received bar code data is to be delivered, the delivery destination information corresponding to an attribute given to the bar code data;

extracts the attribute of the received bar code data to read out the delivery destination information, which is defined corresponding to the attribute, and stores the bar code data in a specified area corresponding to the read delivery destination information; and transfers the stored bar code data to a computer included in the delivery destination, which is specified by the delivery destination information, with a specified procedure.

A transfer processing apparatus according to another aspect of the present invention, which is connected to a communication network for processing data read with a bar code reader and transmitted over the communication network, comprises a receiving portion for receiving the transmitted bar code data, a memory for storing a reference database containing a plurality of procedures, each of which corresponding to an attribute provided with the bar code data, a processor portion for determining the attribute of the received bar code data, the processor portion retrieving the received bar code data, identifying the procedure corresponding to the received data, and processing the bar code data according to the procedure specified by the attribute, and an outputting portion for transmitting the processed data to a remote location as defined in relation to the identified procedure.

BRIEF DESCRIPTION OF THE DRAWINGS

For a more complete understanding of the present invention and the advantages thereof, reference is now made to the following description taken in conjunction with the accompanying drawings.

FIG. 2 is a database for referring to the transfer destination, which is used in the bar code data transfer processing system, according to the embodiment of the present invention.

DETAILED DESCRIPTION OF THE PREFERRED EMBODIMENTS

Figure 1:
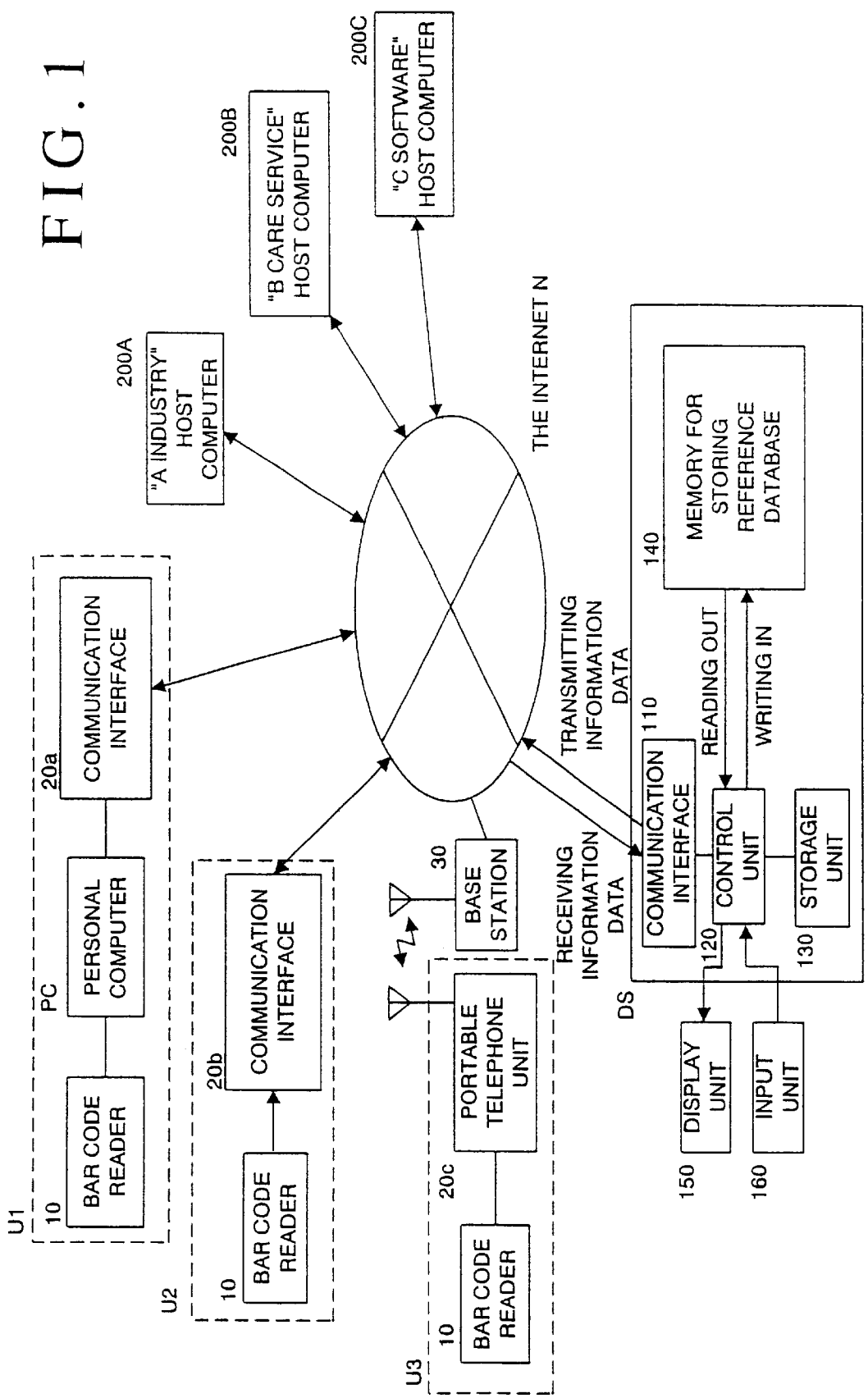
FIG. 1 is a schematic system constitutional view of the bar code data transfer processing system according to an embodiment of the present invention.

Descriptions will be made for an embodiment of the present invention with reference to the accompanying drawings. FIG. 1 is a system constitutional view showing a schematic constitution of a bar code data delivering processing system according to one embodiment of the present invention.

In the system illustrated in this embodiment, a plurality of user terminals U1 to U3, which transmit data inputted by using a bar code, hereinafter referred to as "bar code data," and a plurality of host computers 200A to 200C, which receive the bar code data, are connected to the Internet N, respectively. Between these user terminals U1 to U3 and the host computers 200A to 200C, there is provided a bar code data transfer processing apparatus DS, which is similarly connected to the Internet and primarily mediates transfer of the bar code data between the both. It should be noted that although the Internet is utilized as a data transmission path in this embodiment, other data transmission paths such as a general public line, an dedicated line and a wide area network (WAN) can be used to realize the technological idea disclosed in the present invention.

The user terminals U1 to U3 are constituted so as to connect communication interfaces 20a to 20c, which are needed to send out the bar code data read respectively by the existing bar code reader 10 to the bar code data transfer processing apparatus DS on the Internet. The user terminal U1 is constituted such that a personal computer PC, which is equipped with the bar code reader 10 as an input device, is connected to the Internet through the communication interface 20a. In this case, the communication interface 20a includes a network-connection equipment such as a MODEM and TA, and known software for establishing a connection to the Internet.

The user terminal U2 includes the communication interface 20b, which is capable of sending out the bar code data output from the bar code reader 10 according to a communication protocol on the Internet. The communication interface 20b is a dedicated machine, which is specialized in a function to establish a communication between the bar code reader 10 and a specified access point by receiving a control signal from the bar code reader 10. Specifically, for example, the communication interface 20b includes an I/O unit for transmitting/receiving a signal to/from the bar code reader 10, a control unit for controlling a call origination to a communication line, a connection to an access point and the like in accordance with an input signal from the bar code reader 10, a storage unit for storing a control program and the like, a display unit for displaying an operation state and the like.

The user terminal U3 is a portable terminal, which is constituted by combining the bar code reader 10 and a portable telephone unit 20c. The basic constitution of the portable telephone unit 20c is similar to that of the portable telephone widely used at present, and the portable telephone unit 20c is provided with an interface for inputting/outputting a control signal to/from the bar code reader 10. At the side of the bar code reader 10, there are provided an interface circuit, a control program, a required expansion memory and the like, which are required for originating a call in accordance with an inputted signal to establish an Internet protocol. The user terminal U3 is constituted such that the bar code data, which is inputted by the bar code reader 10, is sent to a base station 30 of a mobile communication enterprise, and is then sent out from the mobile communication base station through a specified gateway to the Internet.

It should be noted that, in the case where the other data transmission paths than the Internet N are used, an interface may be satisfactorily employed, which is suitable for conditions such as a hardware specification and a communication protocol of each transmission path. For example, in the case of using a general public line, as the communication interface 20b for the user terminal U2, a conversion unit (for example, "PIPO," a trademark of NEOREX) can be employed, which is capable of converting a control signal or the like read by the bar code reader 10 into a tone signal to output it via the public telephone line.

As the bar code reader 10, the existing various bar code readers can be selected and employed according to the conditions such as a purpose of usage and a design specification, as well as the "micro-bar code reader" as described above. The above-described various communication interfaces may be satisfactorily designed in consideration with the signal output condition of the bar code readers to be combined or the like. Moreover, although it is not an essential requirement for the present invention, in the case where an identification code is previously given to the bar code reader 10 of each user terminal and then the read bar code data is outputted with the inherent identification code added, the bar code readers by which the inputting of the bar code data has made, can be recorded at each time when the operation is executed. Thus, a post-processing such as operation analysis can be highly facilitated. It should be noted that the control program is constituted as follows. Specifically, a memory such as a ROM, which stores an inherent identification code, is provided in the reader, and the bar code data, which has been read and decoded, is added with the identification code read out from the memory, and then is outputted.

The host computers 200A to 200C are WWW servers owned by enterprises using a service provided by this system, and are respectively connected to the Internet to enable a communication connection with the HTTP protocol. As described later, contents of the bar code data, which are delivered respectively from the user terminals U1 to U3 to the host computers 200A to 200C, follow a protocol determined previously between this system and the enterprises and the like using the service of this system.

The bar code data transfer processing apparatus DS processes the bar code data based on a predetermined rule, the bar code data being received from each of the user terminals U1 to U3. Specifically, the bar code data transfer processing apparatus DS is a WWW server computer built up by a general-use computer, in which an operating system such as Windows NT (a trademark of Microsoft Co., Ltd.) and UNIX (a trademark of Unix System Laboratories) operates. Accordingly, descriptions for the detailed hardware constitution are omitted, and hereinafter, descriptions will be made for a schematic function block diagram shown in FIG. 1.

A communication interface 110 includes hardware and communication software required for establishing a communication connection to the Internet N with the HTTP protocol, and receives the bar code data sent from each of the user terminals U1 to U3.

Moreover the communication interface 110 transfers the processed bar code data, which has been processed as described later, to the host computers as respective transfer destinations. Herein, the term "transfer" stands for that the bar code data is passed and received by the host computer with any known steps. These steps may include transmission of the bar code data to a designated directory and the like of a specified host computer, and obtainment of the bar code data stored in a predetermined storage area by the host computer accessing thereto.

A control unit 120 obtains an attribute of the received bar code data and refers to a database storing a correspondence relation previously defined among an attribute, delivery destination information and designated data processing, thus executing transfer processing of the bar code data.

The database for referring to the destination information is stored in a memory 140. An example of a data record in this embodiment is shown in FIG. 2. The data record generated for each delivery destination stores an item of the bar code data attribute to be an original data for classifying the bar code data for each delivery destination, an item of the delivery destination code corresponding to the item of the bar code data attribute, and an item showing the contents of the specific processing predetermined individually for each delivery destination. These three items are associated with each other. In this embodiment, a range of the numerical value data displayed by the bar code is divided into groups corresponding to each delivery destination, thus classifying the delivery destination. In other words, when numerical bar code data displaying "0000" to "0999" is received, the control unit 120 determines the bar code data to be delivered to the attention of "A Industry (code: AIC)." The delivery destination information includes at least information such as an IP address, which can specify the host computer as a delivery destination with an aspect associated with the above-described delivery destination code or the other appropriate aspect.

And, the control unit 120 as a processor performs such classification of the bar code data so as to store them for the same delivery destination in a storage unit 130, and reads out the item of the specific processing associated with the delivery destination of the bar code data and executes the same. For example, in this embodiment, when the bar code data destined for the "A Industry" is received, the control unit 120 generates text data for confirming a predetermined format. Next, the control unit 120 transfers the text data to the user terminal, which has transmitted the bar code data, based on the IP address of the other party, which has been obtained in the session immediately preceding the reception of the bar code. Subsequently, the control unit 120 transmits the received bar code data to the host computer 200A of the "A Industry."

A display unit 150 and an input unit 160 constitutes respectively man-machine interfaces between the processing apparatus DS and an operator, and includes input/output equipments such as a monitor, a printer, a keyboard and a mouse, and a device driver for operating these.

Figure 3:
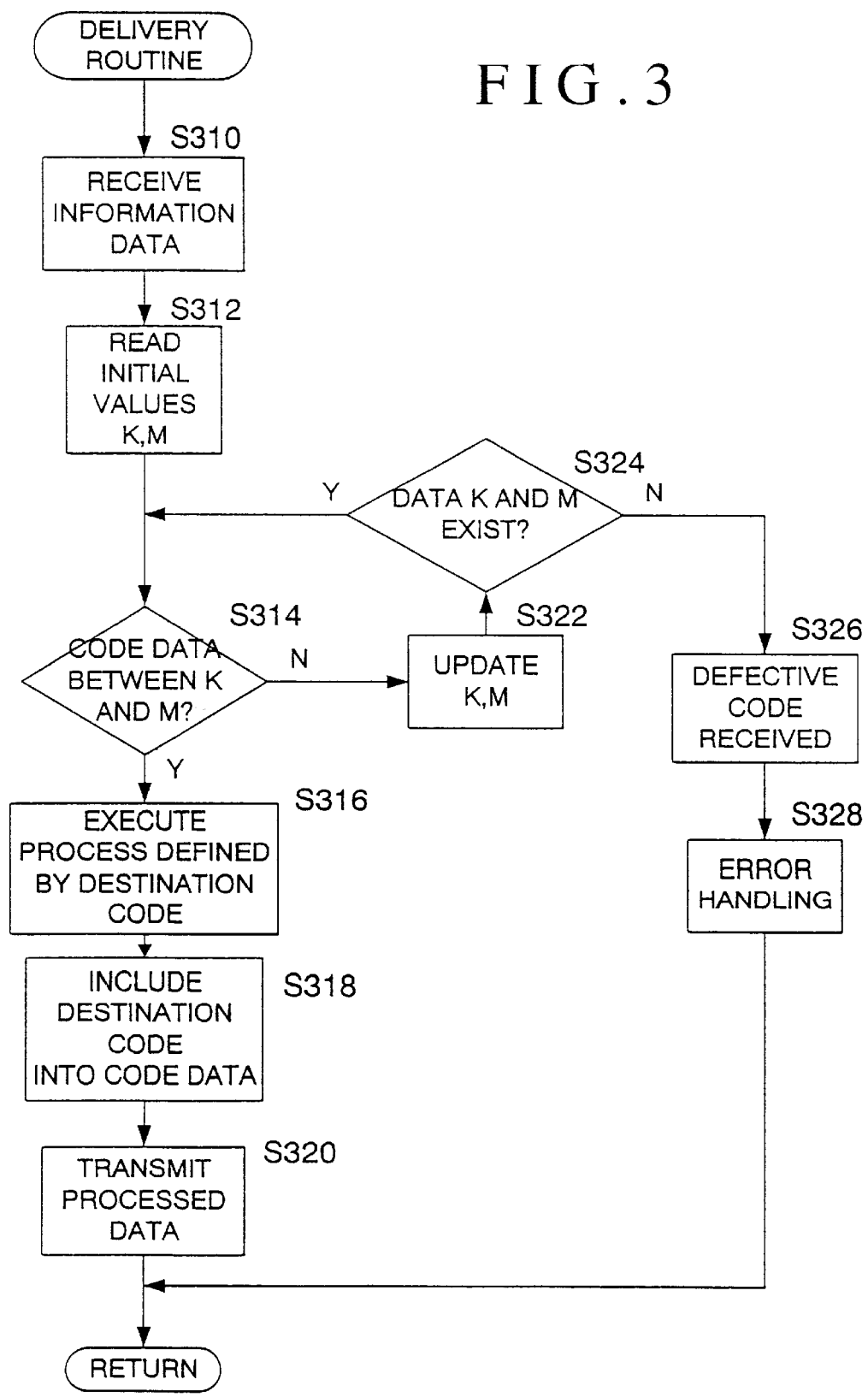
FIG. 3 is a flowchart showing an example of the data processing flow used in the bar code data transfer processing system according to the embodiment of the present invention.

Next, descriptions will be made for the contents of the bar code data processing in an example of this embodiment with reference to FIGS. 1, 2 and 3, which shows a data processing flow of the delivering processing apparatus DS.

First, the delivering processing apparatus DS receives the bar code data from the user terminals U1 to U3 through the communication interface 110 (S310). In accordance with the received bar code data, the control unit 120 reads a combination of initial values (K, M) from the reference database for determining the delivery destination (S312). Since the delivery destination is allocated in accordance with the range of the numerical data displayed by the bar code as described above in this embodiment, the initial values of K=0000 and M=0999 are read out. Based on these initial values, the bar code data is examined whether it exists within the range defined between the numerical values K and M (S314). In other words, if the relation that is 0000 (value of bar code data) 0999 is realized (Yes in S314), the bar code data is determined to be delivered to the attention of the "A Industry" based on the reference database. If the bar code does not exist within the range defined by the above-described initial values K and M (No in S314), the values K and M are updated (S322) to be compared with the bar code data one more time. In this embodiment, values of K=1000 and M=1999 are read. At the time of updating the values of K and M, if the corresponding values of K and M do not exist (Yes in S324), it is determined that the corresponding delivery destination cannot be recognized due to inclusion of some defect in the received bar code data, and a specified error processing such as displaying an error message on the display unit 150 is performed (S328).

In the case where the delivery destination is recognized in the delivery destination determining step S314 (Yes in S314), specific processing set in accordance with the recognized delivery destination is executed (S316). As illustrated in FIG. 3, in the case where the delivery destination is determined to be "B Care Service (code: BCS)" (1000 (value of the bar code data) 1999 in S314), in accordance with the specification previously arranged with the "B Care Service," totalization is performed concerning a job item indicated by the bar code data and a working time computed from the time when the bar code data is received by the processing apparatus DS (i.e., obtained from a system clock of the apparatus DS). Thus, a file, for example, of the CSV format is generated. Thereafter, the file is transmitted to a specified directory in the host computer 200B. Moreover, in the case where the delivery destination is determined to be "C Software Development (code: CSD)" (2000 (value of the bar code data) 2999 in S314), in accordance with the specification previously arranged with the "C Software Development," the bar code data is transmitted to the host computer 200C as it is, that is, without specific processing. In this case, the host computer as the transfer destination may access the bar code data stored in a specified storage area in the delivering apparatus in accordance with each delivery destination information, to obtain the stored bar code data.

It should be noted that, as the attribute of the bar code data for specifying the delivery destination, various aspects may be employed such as inclusion of a unique character string corresponding to each delivery destination into the bar code data, other than the numerical value range exemplified in this embodiment. In the control unit 120 of the delivering processing apparatus DS, a determination sequence may be satisfactorily incorporated according to the aspect employed. Moreover, even in the case where the numerical value is made to correspond to each delivery destination, a numerical value range may be freely defined so as to be associated with the destination information. Accordingly, appropriate numbers may be selected from among the corresponding numerical number rage in a so-called "wormhole" state, instead of selected along with the consecutive numerical values.

Moreover, the bar code data processing apparatus DS is not limited to the constitution of this embodiment, but may be arranged, for example, in the form of a rental server in an intra-network of the enterprise utilizing the service, the network being connected to the communication network such as the Internet.

As described above in detail, according to the transfer processing system for the bar code data in accordance with the present invention, the following effects can be achieved:

(1) The bar code data read with the bar code reader is sent to the transfer apparatus through the communication network, and transferred to the computer as the delivery destination based on the destination information, which is previously defined in accordance with the attribute of the bar code data in the transfer apparatus. Thus, the user of the bar code reader does not need to check or set the connection destination at each time of transferring.

(2) The received bar code data is subjected to the processing previously set in accordance with the corresponding destination information. Thus, a specified message can be sent individually to the transmitter of the bar code data, or pre-processing of the data can be performed, which is required at the delivery destination.

(3) Furthermore, the bar code reader is allocated with each inherent identification code and the identification code allocated is made to be output as well as the read bar code data. Thus, the information concerning the transmitter of the bar code data can be provided to the delivery destination at each time of transmitting.

Although the preferred embodiment of the present invention has been described in detail, it should be understood that various changes, substitutions and alterations can be made therein without departing from spirit and scope of the invention as defined by the appended claims.

What is claimed is:

1. A system for executing transfer processing of bar code data, comprising:
    (A) at least one bar code reader, said bar code reader:
        (1) being capable of reading bar code data from a bar code, wherein an attribute is given to the bar code data,
        (2) comprising a communication interface, and
        (3) being capable of connecting to a communication network via the communication interface,
        wherein the communication interface is capable of sending the bar code data read by the bar code reader to the communication network towards a transfer apparatus; and
    (B) the transfer apparatus, the transfer apparatus:
        (1) being capable of connecting to the communication network,
        (2) being capable of receiving the bar code data that has been read with the bar code reader and transmitted via the communication interface over the communication network,
        (3) storing predetermined destination information indicating a destination to which the received bar code data is to be transferred, wherein the destination information is defined in advance in accordance with the attribute given to the bar code data,
        (4) being capable of
            (a) extracting the attribute of the received bar code data, and
            (b) reading out the destination information, which is defined corresponding to the attribute,
        (5) being capable of storing the received bar code data in a predetermined area corresponding to the read destination information, and
        (6) being capable of transmitting the stored bar code data to a computer included in the destination, which is specified by the destination information, according to a predetermined procedure.

2. A transfer processing system according to claim 1, wherein the bar code data stored corresponding to the destination information is subjected to predetermined processing in accordance with the destination information, and the processed bar code data is transferred to the computer included in the destination with a specified procedure.

3. A transfer processing system according to claim 1, wherein each of the bar code readers is allocated with an inherent identification to be outputted with the read bar code data.

4. A transfer processing apparatus connected to a communication network for processing data read with a bar code reader and transmitted over the communication network, comprising:
    a receiving portion for receiving said transmitted bar code data;
    a memory for storing a reference database containing a plurality of procedures, each of which corresponding to an attribute provided with the bar code data;
    a processor portion for determining the attribute of the received bar code data, the processor portion retrieving the received bar code data, identifying the procedure corresponding to the received data contained in the reference database, and processing the bar code data according to the procedure specified by the attribute; and
    an outputting portion for transmitting the processed data to a remote location as defined in relation to the identified procedure.

5. A processing apparatus according to claim 4, wherein said bar code data contains a code representing a destination on the communication network.

* * * * *